(12) United States Patent
Martin

(10) Patent No.: US 6,804,667 B1
(45) Date of Patent: Oct. 12, 2004

(54) FILTER FOR CHECKING FOR DUPLICATE ENTRIES IN DATABASE

(75) Inventor: Robert E. Martin, Redondo Beach, CA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/450,575

(22) Filed: Nov. 30, 1999

(51) Int. Cl.$^7$ .............................................. G06F 7/00
(52) U.S. Cl. ........................... 707/6; 707/10; 709/200
(58) Field of Search ................................ 709/200, 217, 709/218, 249, 219; 707/10, 1–8, 100–102, 104.1, 200–205, 514, 531–533; 715/514, 531–533

(56) References Cited

U.S. PATENT DOCUMENTS

| | | | | |
|---|---|---|---|---|
| 5,511,190 A | * | 4/1996 | Sharma et al. .................. | 707/1 |
| 5,522,066 A | * | 5/1996 | Lu .................................. | 707/1 |
| 5,691,524 A | * | 11/1997 | Josephson ..................... | 705/40 |
| 5,701,464 A | * | 12/1997 | Aucsmith ...................... | 707/10 |
| 5,960,430 A | * | 9/1999 | Haimowitz et al. ............ | 707/1 |
| 6,073,160 A | * | 6/2000 | Grantham et al. ............. | 705/40 |
| 6,134,551 A | * | 10/2000 | Aucsmith ..................... | 707/10 |
| 6,199,068 B1 | * | 3/2001 | Carpenter .............. | 340/870.03 |
| 6,223,187 B1 | * | 4/2001 | Boothby et al. ............... | 707/10 |
| 6,339,824 B1 | * | 1/2002 | Smith et al. ................. | 713/157 |
| 6,363,366 B1 | * | 3/2002 | Henty ......................... | 705/400 |
| 6,374,266 B1 | * | 4/2002 | Shnelvar ..................... | 707/204 |
| 6,421,666 B1 | * | 7/2002 | Murthy et al. ................ | 707/3 |
| 6,430,496 B1 | * | 8/2002 | Smith et al. ................. | 701/117 |
| 6,430,539 B1 | * | 8/2002 | Lazarus et al. .............. | 705/10 |

* cited by examiner

Primary Examiner—Greta Robinson
Assistant Examiner—Harold E. Dodds
(74) Attorney, Agent, or Firm—Gregory A. Welte

(57) ABSTRACT

A system for determining whether a record-to-be-added to a database is a duplicate of an existing record. The database is first processed, to generate a library of signatures, one for each record. For example, assume each record contains a phrase. The signature may be a concatenation of the first letters of each word in the phrase. Thus, the signature for "Cats like milk" would be CLM. After generation of the library, when a new record is to be added to the database, a signature is generated for the new record. That signature is compared with the library. In this example, if the new record is "Cats like milk," and if "CLM" is not found in the library, then it is conclusively known that "Cats like milk" is not present in the database. The new record can be added, without fear of duplication. However, if "CLM" is found in the library, that fact is not dispositive. "CLM" could be present because of the different phrase "Cats like mice" in a record. If such a matching signature is found, then human intervention is called for, to determine whether the new record duplicates an existing record.

12 Claims, 10 Drawing Sheets

TABLE

| LOCATION OF BANK BRANCH | ASSETS | CUSTOMER | ACCOUNT BALANCE |
|---|---|---|---|
| ANTIOCH | 1000 | WILSON | 100 |
| ANTIOCH | 1000 | WALLACE | 50 |
| ANTIOCH | 1000 | UNSER | 75 |
| BUFFALO | 3000 | VICTOR | 40 |
| BUFFALO | 3000 | THOMAS | 125 |
| CHARLESTON | 2500 | RANDALL | 90 |
| CHARLESTON | 2500 | STEVENS | 200 |

ETC

FIG. 1

TABLE

| LOCATION OF BANK BRANCH | ASSETS | CUSTOMER | ACCOUNT BALANCE |
|---|---|---|---|
| ANTIOCH | 1000 | WILSON | 100 |
| ANTIOCH | 1000 | WALLACE | 50 |
| ANTIOCH | 1000 | UNSER | 75 |
| BUFFALO | 3000 | VICTOR | 40 |
| BUFFALO | 3000 | THOMAS | 125 |
| CHARLESTON | 2500 | RANDALL | 90 |
| CHARLESTON | 2500 | STEVENS | 200 |

ETC

FIG. 2

TABLE

| LOCATION OF BANK BRANCH | ASSETS | CUSTOMER | ACCOUNT BALANCE |
|---|---|---|---|
| ANTIOCH | 1000 | WILSON | 100 |
| ANTIOCH | 1000 | WALLACE | 50 |
| ANTIOCH | 1000 | UNSER | 75 |
| ANTIOCH | 1000 | UNSER | 75 |
| BUFFALO | 3000 | VICTOR | 40 |
| BUFFALO | 3000 | THOMAS | 125 |
| CHARLESTON | 2500 | RANDALL | 90 |
| CHARLESTON | 2500 | STEVENS | 200 |

ILLEGAL (rows 3–4)

ETC

TABLE

| BRANCH BANK | ASSETS |
|---|---|
| ANTIOCH | 1000 |
| BUFFALO | 3000 |
| CHARLESTON | 2500 |
| DODGE CITY | 1500 |
| EUREKA | 4000 |
| FALLS MILL | 2300 |
| GREATNECK | 1800 |
| HUBER BLUFF | 1200 |

INDEX TABLE

| BRANCH BANK | SECTOR, CYLINDER |
|---|---|
| ANTIOCH | 4,2 |
| BUFFALO | 0,2 |
| CHARLESTON | 2,2 |
| DODGE CITY | 7,1 |
| EUREKA | 6,1 |
| FALLS MILL | 4,0 |
| GREATNECK | 3,1 |
| HUBER BLUFF | 5,2 |

FIG. 12

| NAME SURNAME | NAME GIVEN | STREET NUMBER | STREET NAME | CITY | STATE | ZIP | TELEPHONE AREA CODE | TELEPHONE NUMBER |
|---|---|---|---|---|---|---|---|---|
| ADAMS | JACK | 6363 | OAK | DAYTON | OH | 45454 | 937 | 445 – 6262 |
| BAKER | STAN | 41 | CHERRY | DAYTON | OH | 45456 | 937 | 445 – 6333 |
| DEXTER | PHIL | 477 | DRAKE | DAYTON | OH | 45444 | 937 | 445 – 6223 |

FILTER FOR CHECKING FOR DUPLICATE ENTRIES IN DATABASE

The invention concerns a method and apparatus for checking whether a new record to be added to a database is a duplicate of an existing record.

BACKGROUND OF THE INVENTION

FIG. 1 illustrates a simple table which exists in a hypothetical database of a bank. The table lists four types of information, arranged in columns: (1) the cities in which the bank branches are located, (2) the total assets, or deposits, of each branch, (3) the customers who maintain accounts at each branch, and (4) the balance of each account.

During operation of the bank, entries within a row will change. (A row is also sometimes called a "record.") For example, if fifty dollars is deposited to the WILSON account, the ACCOUNT BALANCE will be changed to $150.

An entire row may change, as when it is deleted. For example, the row "ANTIOCH, 1000, WILSON, 100" may be deleted when the Wilson account closes. Conversely, a row may be added when a new customer opens an account.

Some types of databases do not allow a new row to be added if the new row contains information which is identical to that contained in an existing row. For example, if a new customer named UNSER wishes to open an account at the ANTIOCH branch by depositing 75 dollars, a duplicate row would be created. However such a situation is illegal, as indicated in FIG. 2.

The duplicate row can create several problems. For example, if the first UNSER wishes to close the account, the question arises, Which row should be deleted? As another example, an uninformed observer may view the duplicate row as a mistake, and presume it to be a duplicate of the first UNSER's data, when, in reality, it represents the account of a second UNSER.

Several approaches are available to prevent this duplication. In one approach, when a new row is to be added, all rows of the database are examined, and compared with the new row. If the examination finds that the new row matches no existing row, the new row is added.

However, this approach is time-consuming. For example, assume that a fresh database is created, and contains a single row. When a second row is added later, a single comparison is required, between the second and first row. Addition of the third row requires two comparisons. In general, the number of comparisons is proportional to the number of existing rows, as indicated in FIG. 3.

However, the total number of comparisons performed since creation of the database is a square-law function of the number of rows, as indicated in FIG. 4. Viewed graphically, the total number of comparisons, past and present, equals the area of the hatched triangle. The area of the triangle equals (½)×(no. of rows)2. If one million rows are present today, then a total of 5×1011 comparisons have been made so far, in adding a new row today.

These comparisons are time-consuming.

OBJECTS OF THE INVENTION

An object of the invention is to provide an improved database management system.

A further object of the invention is to provide an improved system for preventing duplication of rows in a database.

SUMMARY OF THE INVENTION

A Bloom Filter is generated, based on the database. When a new row is to be added, the Bloom Filter is consulted to determine whether the new row duplicates an existing row. If duplication is not found, the new row is added.

BRIEF DESCRIPTION OF THE DRAWINGS

FIG. 1 illustrates a hypothetical table in a database.

FIG. 2 illustrates duplication of a row in the database.

FIGS. 12 and 13 are flow charts illustrating logic implemented by one form of the invention.

DETAILED DESCRIPTION OF THE INVENTION

Background on Indexing in Databases

Index Table

Figure 3:
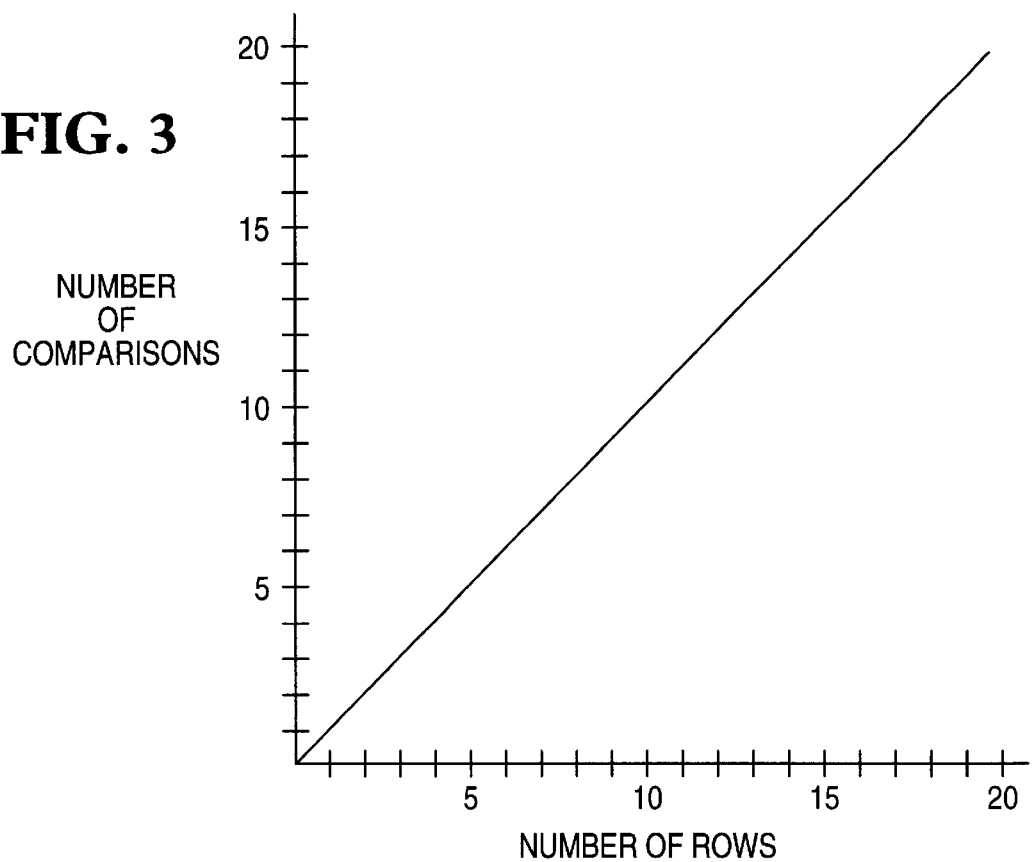
FIG. 3 illustrates how the number of comparisons required is a linear function of the number of existing rows to which a new row is to be compared.
Figure 4:
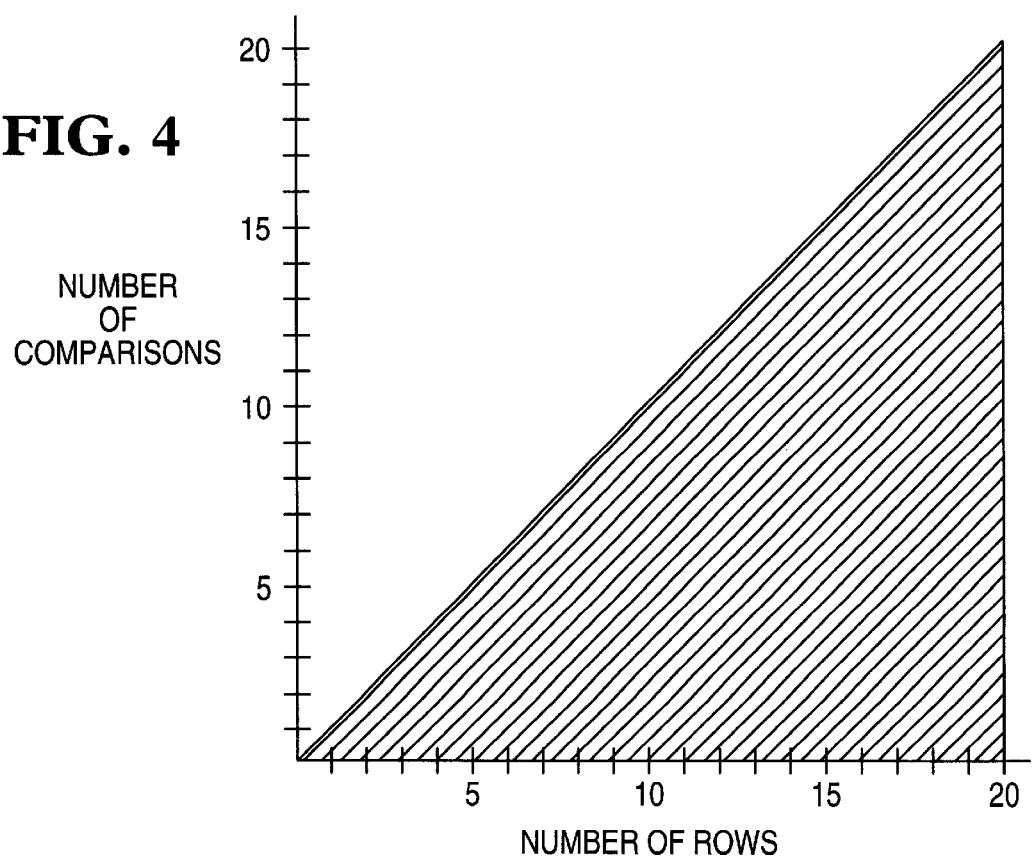
FIG. 4 illustrates how the historical total of the number of to comparisons in FIG. 3 is a square-law function of the number of existing rows.
Figure 5:
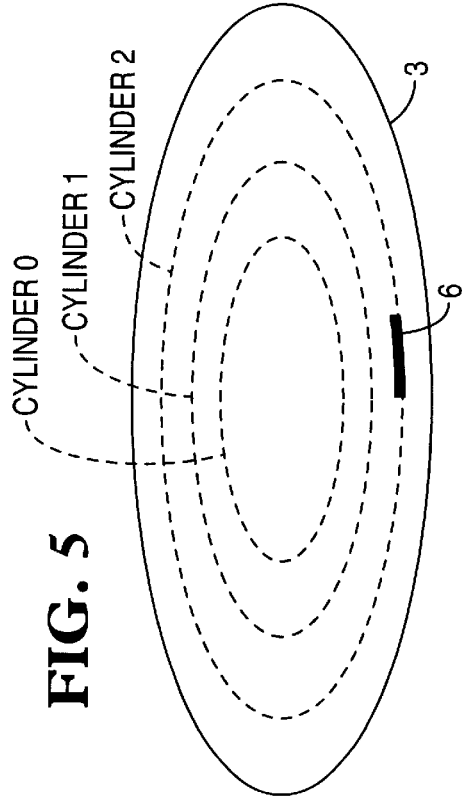
FIGS. 5–8 illustrate a common addressing convention utilized in disc drives.
Figure 6:
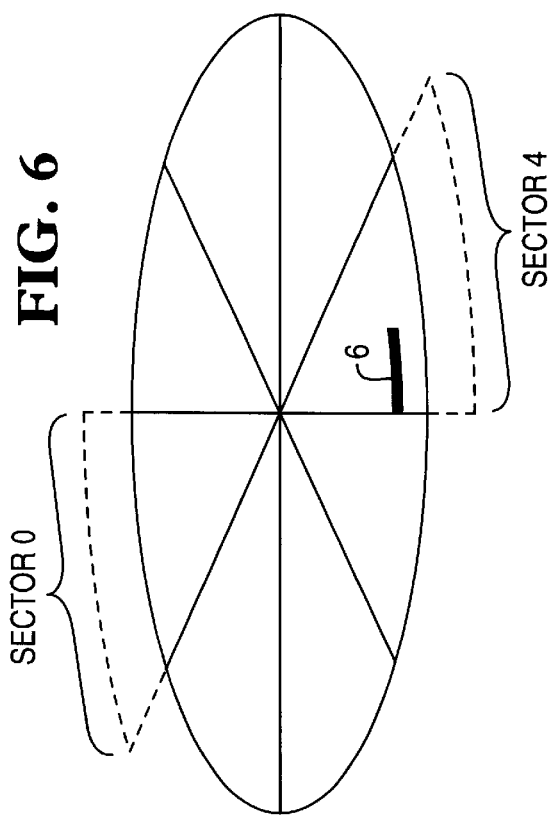
Figure 7:
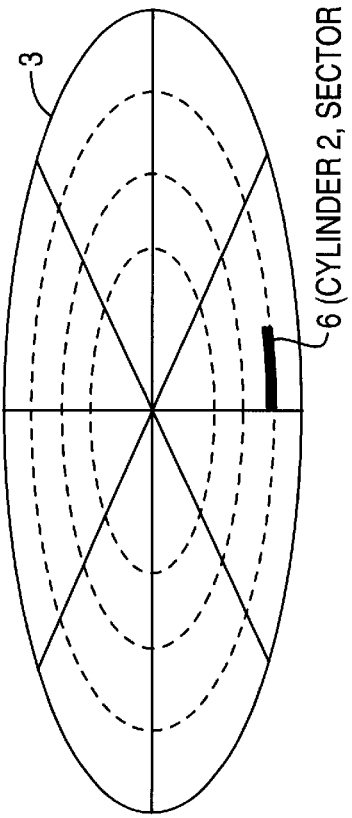

Today, large databases are stored in disc drives. Whether a single disc drive is used, or multiple drives are ganged together, a coordinate 10 system is used to provide an address for each location on the disc. FIGS. 5–7 illustrate a common coordinate system.

FIG. 5 shows a disc 3, containing concentric rings, termed cylinders. The cylinders represent the relative path taken by a read/write head (not shown) when the disc 3 rotates. Block 6 represents a piece of data, such as a row from the table of FIG. 1.

FIG. 6 shows sectors superimposed upon the disc 3, with sectors 0 and 4 labeled. FIG. 7 shows both cylinders and sectors superimposed on the disc 3. According to FIG. 7, block 6 is located at the address (CYLINDER 2, SECTOR 4). In the general case, which covers the use of multiple disc drives, the address of a block would be (DRIVE NUMBER, CYLINDER, SECTOR).

Figure 8:
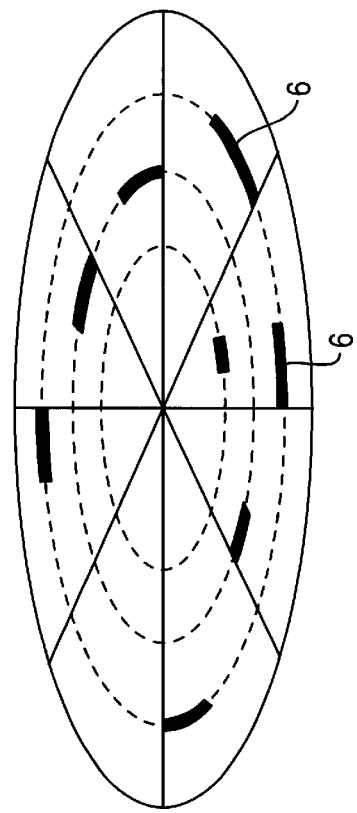

FIG. 8 illustrates multiple blocks 6, each at a different address. As stated, each block 6 contains data for a row of a table. Once the data is stored on the disc 3, the question arises of how to locate and retrieve a desired data block.

In a brute-force approach, block-after-block can be read, starting at the outermost cylinder, until the desired block is reached. Under this approach, if the entire disc 3 requires a total time T to read fully, then the desired block will probably be found after a time T/2.

This approach can be very time-consuming for large databases.

Figures 9, 10:
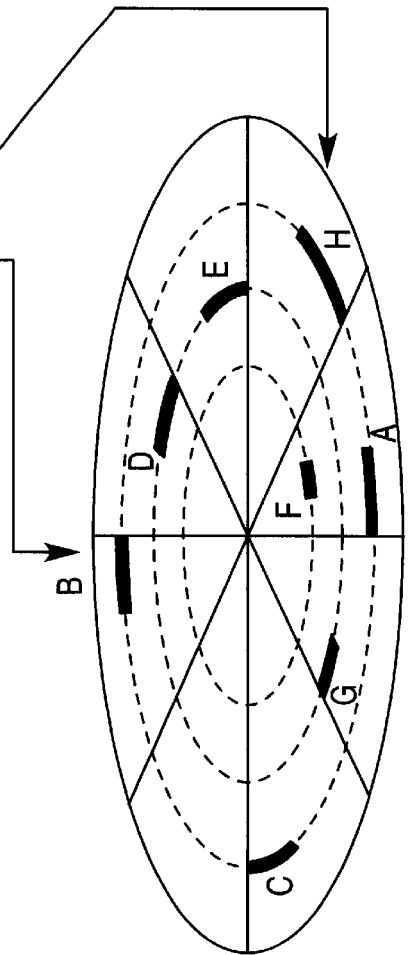
FIGS. 9 and 10 illustrate the concept of indexes, as used in databases.

One improvement to this approach is to generate an index for the database. FIG. 9 illustrates a subset of the Table of FIG. 1, and FIG. 10 illustrates an index. Each row of the table of FIG. 10 contains the name of a city, and that name corresponds to a name, and thus a row, in FIG. 9. Each row in FIG. 10 lists a physical address on the disc 3 for its city, thereby indicating the physical locations for the rows of FIG. 9.

Of course, in reality, each city name of FIG. 9 will occur in multiple rows, as indicated in FIG. 1, because each city represents a bank branch, and each bank branch serves multiple customers. The index table of FIG. 10 is extended to this situation in a straightforward manner.

This arrangement allows a convenient prevention of the illegal situation of FIG. 2. If a second UNSER opens an account at the ANTIOCH branch, the index table of FIG. 10 is consulted to locate the records of all depositors at the ANTIOCH branch. Those records are read from the disc 3, and the records of all UNSERs are examined. If the new UNSER record is seen to match an existing record, the new record is not added.

However, this examination process requires time.

Hashed Index

A simple hashed indexing system will be explained.

Figure 11:
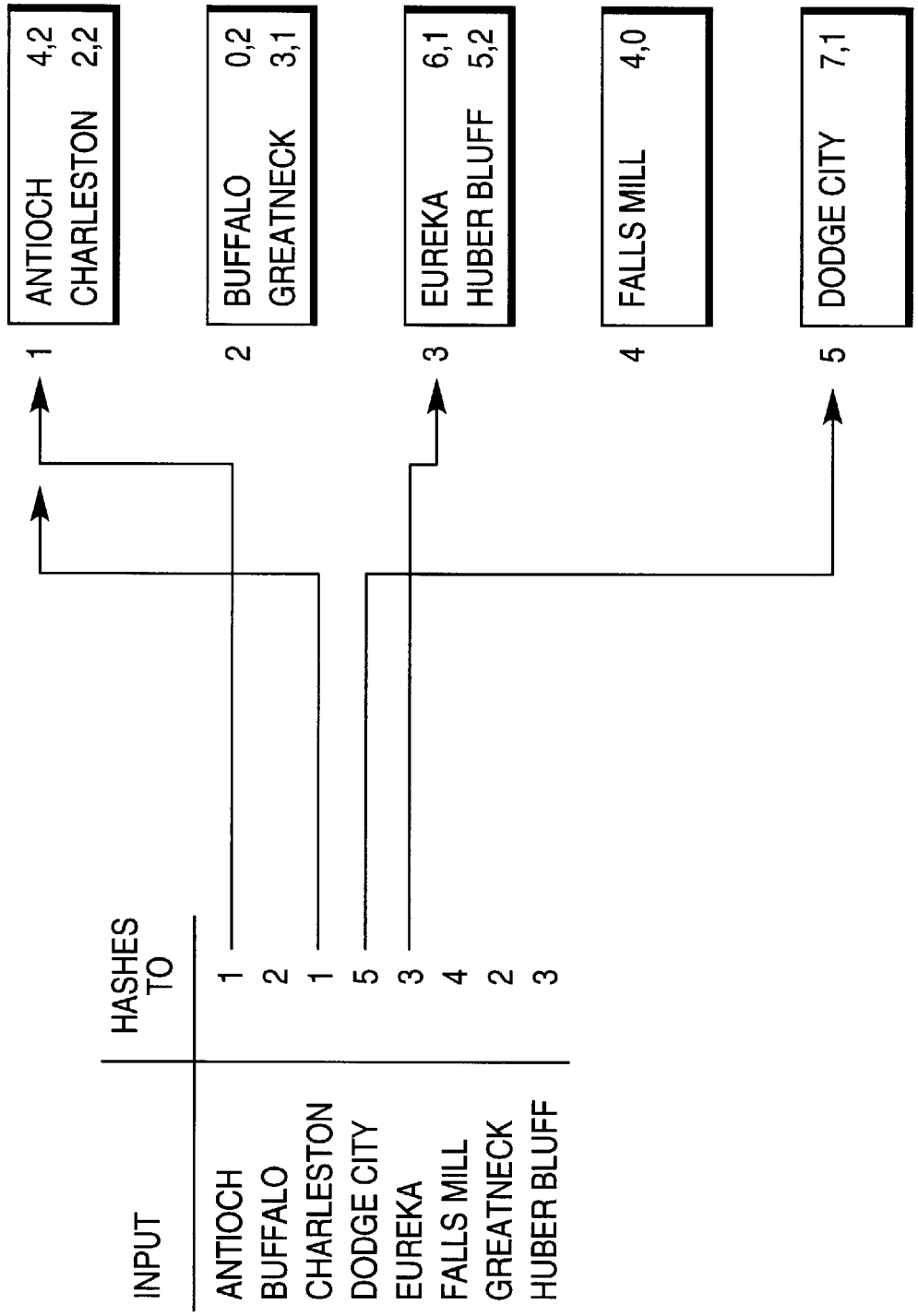
FIG. 11 illustrates hashed indexing.

FIG. 11 shows five "buckets," also called "hash units," which are memory locations. Each bucket is located at an address in memory. Each bucket corresponds to a bank branch, and contains the physical address (disc drive, sector, cylinder) where the records for the branch are located. For example, the five buckets may reside at consecutive memory addresses 1 through 5. Address 1 contains the physical address of the first records for the Antioch and Charleston branches. Address 2 contains the physical address of the first records of the Buffalo and Great Neck branches, and so on.

When a record is to be located, the name of the branch is given to a hash function, which is a particular mathematical algorithm, or equation. The hash function computes the address of the bucket corresponding to the branch. For example, the left side of the Figure indicates that the input name "Dodge City" hashes to bucket number 5, which contains the physical address of the first record for the Dodge City branch.

When the user (or a computer program being run by the user) locates the bucket for the branch being sought, the user searches through the bucket for the branch, and, when it is found, obtains the physical address of the branch's records.

That physical address points to the location of the first record for the branch. That record, and all the others except the last, also contain pointers, which identify the physical address of the next record for that branch. The user reads the records consecutively, starting with the first, until the desired record is found.

Of course, this is a generalized example. Variations are possible. In one variation, the hash function computes not a bucket address, but the physical address of the first record of the branch which is provided as input to the hash function. That is, the intermediary use of the buckets is eliminated, and the output of the hash function contains the data (disc drive number, cylinder, sector) for the branch which was input to the hash function.

One Form of the Invention

Figure 13:
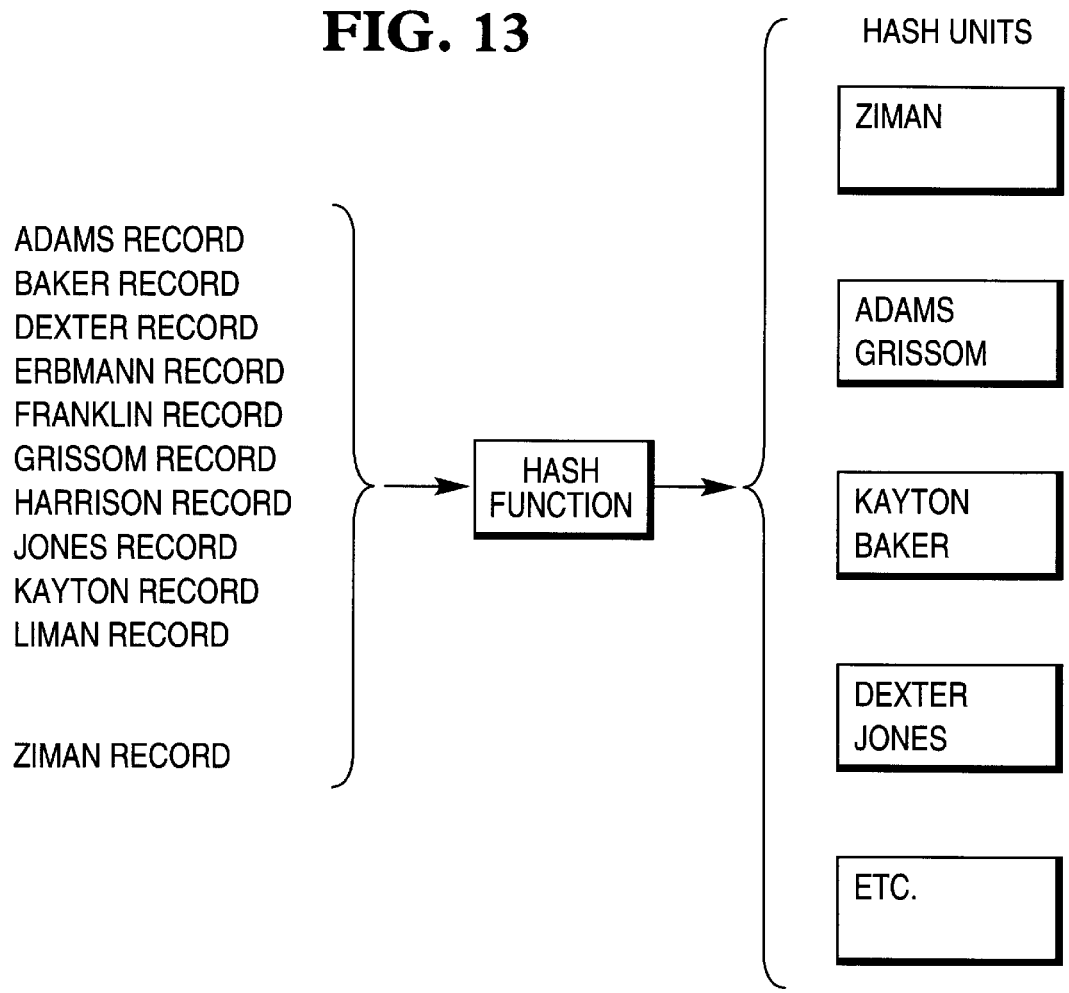

Rows of data are first allocated into "hash units," which are analogous to the buckets described above. FIG. 13, described below, shows records (or rows) in a telephone directory (a database) being allocated into hash units. For each individual hash unit, the invention generates a small data structure for the records contained in the hash unit. This data structure contains sufficient information to definitely answer "Yes" (if that is correct) to the question, "Is a given record-to-be-added already contained within the hash unit?" However, if "No" is the correct answer, the data structure cannot definitively give that answer, for reasons explained below.

The structure is known as a Bloom Filter, and, in effect, is a collection of all records already in the hash unit. The Bloom Filter does not actually contain all the records, but effectively contains them, in the form of "signatures," which are explained below.

The Bloom Filter thus allows a quick determination of whether a row to be added is already contained within the hash unit. If so, the addition is not performed.

Bloom Filters are known in the art, and are described in the article by Burton Bloom, "Space-Time Trade-offs in Hash Coding," *Communications of the ACM*, vol. 13, page 7 (July, 1970). They are also described in U.S. Pat. No. 5,701,464, which is hereby incorporated by reference.

Use of the Bloom filter will be explained with reference to FIG. 12, which shows another type of database, namely, a telephone directory. Each row is called a record, and each column is called a field.

Under the invention, the records are organized into a hashed database as indicated in FIG. 13. The rows are placed into "hash units" by hashing a key contained in each row. The key may be the last name (surname) of a record, or row, which is not necessarily unique to each record, because different people may have the same last name. In another approach, the key may be unique, as when it is a unique account number assigned to each record.

The output of the hashing operation is a grouping of records into hash units, as indicated. In general, the hash units correspond in function to the buckets described above.

Sometimes, new rows will be added to a hash unit. The invention checks to see whether a new row duplicates an existing row. If so, the new row is rejected.

The new row is not modified, and then added, as done in the system described in the Background of the Invention. The duplication is considered as an absolute prohibition, and the attempted duplication would violate the prohibition. The party attempting to perform the duplication must resolve the problem, and avoid the duplication. The invention is not involved in that resolution process.

Figure 14:
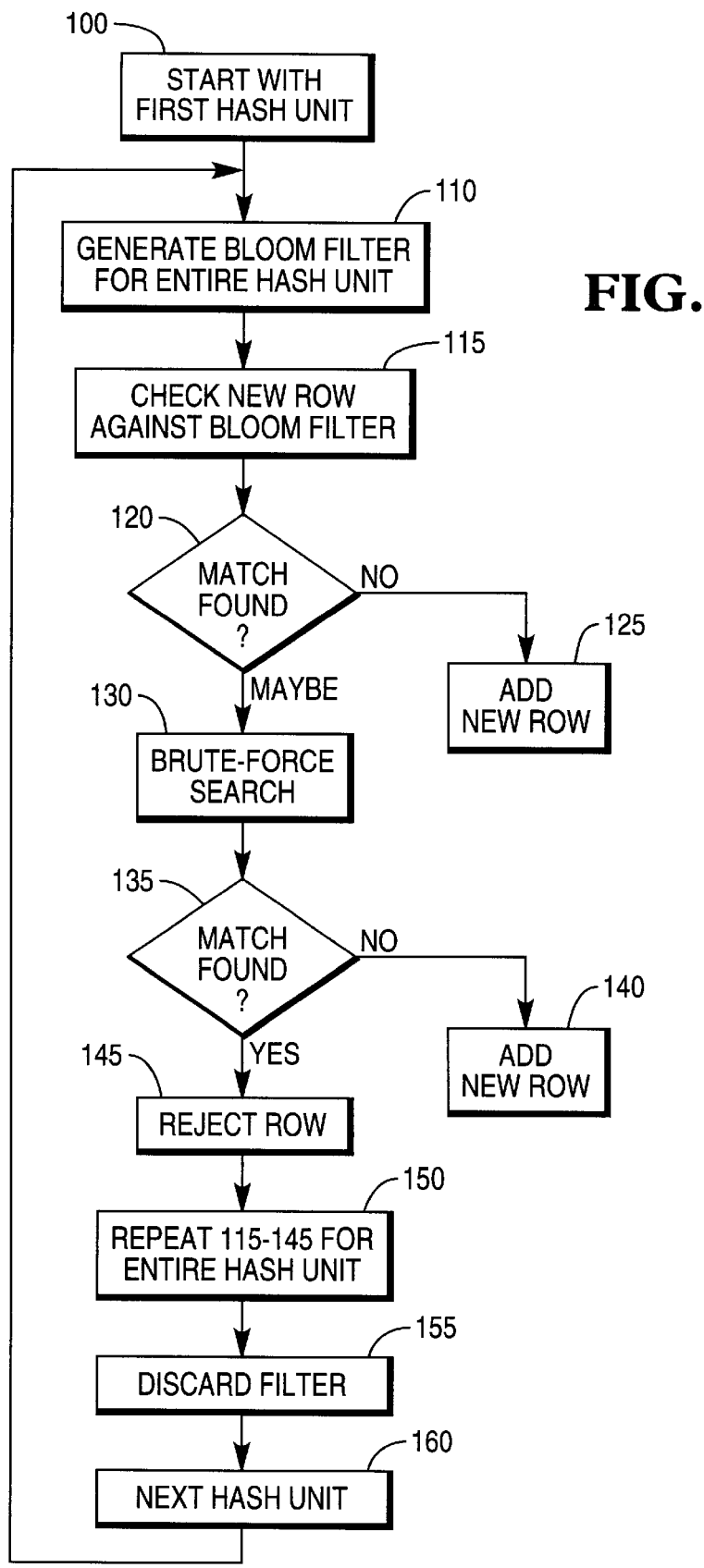
FIG. 14 illustrates one form of the invention.

FIG. 14 is a flow chart used by the invention in this duplication-detection. In block 100, the first hash unit is selected. In block 110, a single Bloom Filter is generated for the hash unit by combining the signatures of all the records in the hash unit. These signatures are usually bit masks, where each signature is generated from a combination of hash functions (which is Bloom's technique to improve discrimination). The triplets discussed below provide an analogy which explains some concepts underlying Bloom's signatures.

The Inventor emphasizes that the hash functions for forming the signatures are different from the hash function used to place rows into hash units. Two types of hash function are involved.

After the signatures are generated, the signatures for all records in a hash unit are again combined to finally produce the filter, so that it reflects the current, combined record population of the hash unit.

In block 115, a new row-to-be-added to that hash unit is checked against the Bloom Filter. The Bloom Filter, as explained below in greater detail, has a unique property: It can confirm the absence of duplication, but not the presence of duplication.

That is, the Bloom Filter can definitely give permission to add a new row, if the new row will not duplicate an existing row. However, the converse is not true. The Bloom Filter cannot positively confirm that a new row is a duplicate, if that is so.

To repeat: the Bloom Filter can confirm absence of duplication, but cannot confirm presence of duplication.

If decision block 120 indicates that the new row is not a duplicate of an existing row, the NO branch is taken, and the new row is added by block 125. The Bloom Filter confirmed non-duplication.

If this decision block 120 indicates that the new row may be a duplicate of an existing row, the MAYBE branch is taken. In this case, block 130 is reached, wherein a brute-force search is undertaken of all relevant rows (entire hash unit or the relevant group of common primary key values), to ascertain whether the new row duplicates an existing row.

If decision block 135 finds that no duplication is found, the new row is added, in block 140. If duplication is found, the new row is rejected, in block 145, and that row is not added.

As block 150 indicates, this process is repeated for the other rows to be added to this hash unit.

As block 155 indicates, when all new rows for a given hash unit have been processed, the Bloom Filter for that hash unit is discarded.

As block 160 indicates, the next hash unit is processed. A Bloom Filter is generated for that hash unit, and the logic, beginning with the path following block 100, repeats for that hash unit. This cycling repeats until all hash units have been processed.

Analogy for Bloom Filter

Figures 15, 16:
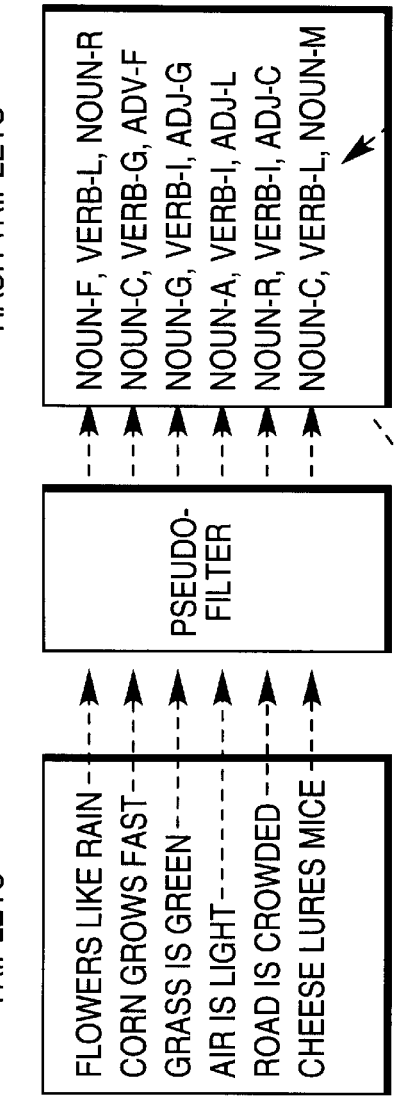
FIG. 15 illustrates a hash unit including a number of three word English phrase, referred to as "triplets".
FIG. 16 illustrates a process utilizing a pseudo Bloom Filter for detecting the absence of triplet duplications in the hash unit of FIG. 15.

An analogy will explain some of the principles utilized by the Bloom Filter. This analogy will explain a "pseudo" Bloom Filter. Assume that a hash unit contains English phrases, of three words each, as indicated in FIG. 15. Each phrase is a triplet. The words may be nouns, pronouns, verbs, adjectives, adverbs, but nothing else.

The pseudo-filter of FIG. 16 does two things for each triplet. One, it identifies each word as noun, pronoun, verb, etc. Two, it identifies the first letter of each word. FIG. 16 indicates the results of the identification process. For each triplet within the hash unit, a "hash triplet" is generated.

When a new triplet is to be added to the hash unit, it is processed by the pseudo-filter, to produce its own corresponding hash triplet. For example, if the new triplet is "Dogs chase cats," the hash triplet will be "noun-D, verb-C, noun-C," as indicated. That hash triplet is compared with the existing group of hash triplets within the pseudo-filter. As arrow A1 indicates, that hash triplet matches no existing hash triplet within the pseudo-filter. Consequently, it is known, with certainty, that the new triplet matches no triplet within the hash unit.

However, if the new triplet were "cats like mice," as indicated, its hash triplet would be "noun-C, verb-L, noun-M." As indicated by arrow A2, that matches the hash triplet corresponding to "cheese lures mice," which has the same hash triplet, namely, "noun-C, verb-L, noun-M."

Consequently, if "cats like mice" is to be added, the pseudo-filter indicates that a matching hash triplet already exists. But the matching hash triplet is not conclusive: two different triplets can hash to the same hash triplet, as just demonstrated.

The hash triplets illustrate this property of the Bloom Filter: it can confirm absence of duplication, but cannot confirm presence of duplication.

For "cats like mice," a brute-force search is undertaken of the hash unit (that is, the list of triplets in FIG. 16), to ascertain whether "cats like mice" duplicates an existing triplet. Since it does not, "cats like mice" will be added.

This analogy is a simplification of the Bloom Filter. In practice, redundancies would be eliminated from the hash triplets. For example, after addition of the triplet "cats like mice," the hash triplet "noun-C, verb-L, noun-M" will appear twice, for both "cats like mice" and "cheese lures mice." But there is no reason for the redundancy. The redundancy can be eliminated at the time of creation of the second, redundant, hash triplet, as by checking it against all existing hash triplets when it is created, and eliminating it if it duplicates another hash triplet.

It is emphasized that the triplets under discussion form an analogy. It is not an exact description of Bloom's procedure. As indicated earlier, Bloom's technique for forming a signature for a single record actually involves several hash functions. This extension is not easily represented by the triplet analogy, but is described in Bloom's paper.

Additional Consideration

Figure 17:
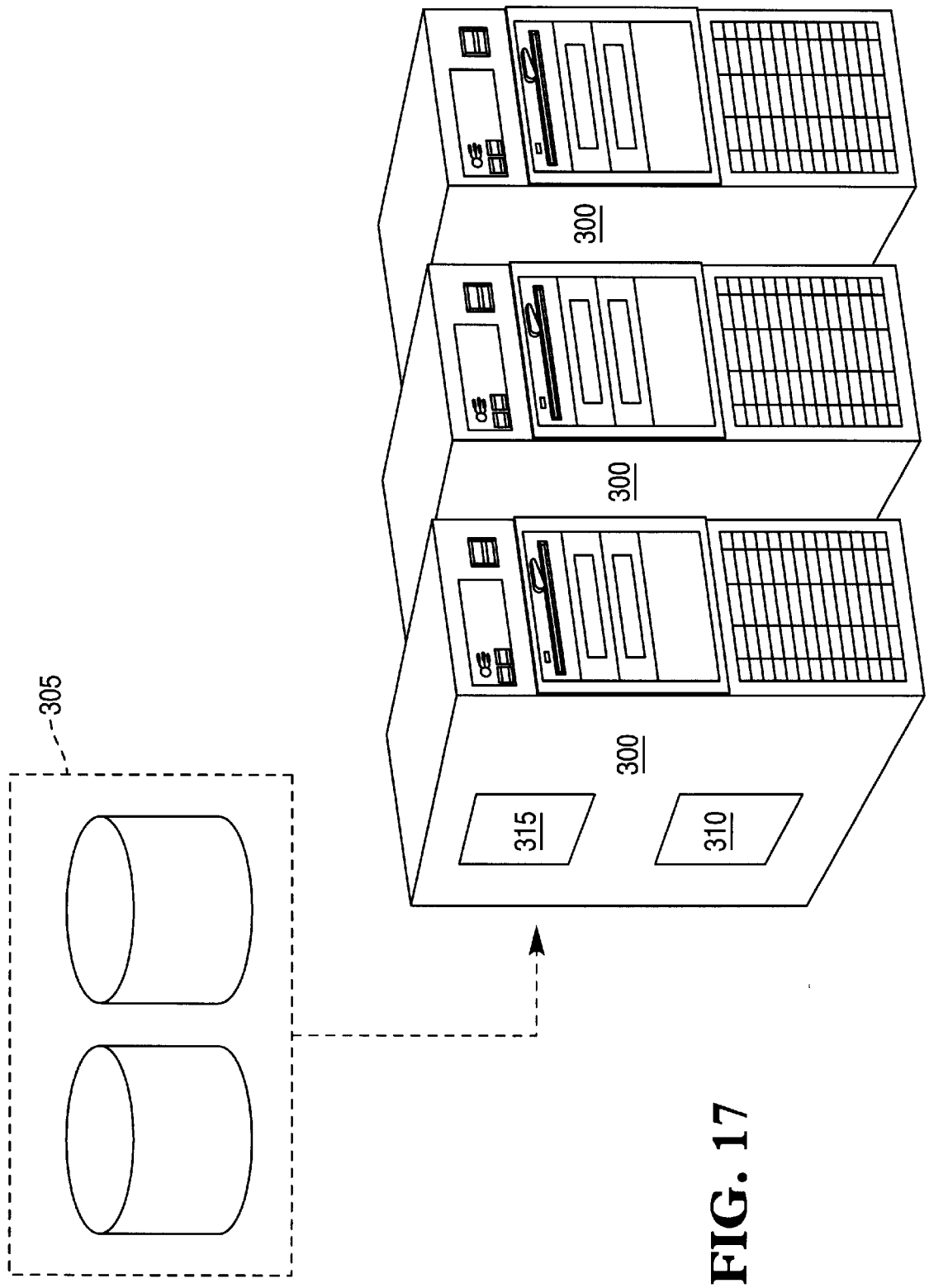
FIG. 17 illustrates hardware components for implmenting one form of the invention.

1. FIG. 17 illustrates one form of the invention. Computers 300 contain mass storage 305, which contains one, or more, databases. Computers 300 also contain a database management system 310, known in the art. Block 315 represents software and hardware which implement the procedures described herein.

2. In another form of the invention, the Bloom Filters are not discarded, but are stored for further use.

3. The terms "hash function" and "hash unit" were used above. A hash function is a mathematical function, or algorithm. A major feature lies in its many-to-few operation. That is, as the pseudo-filter described above indicates, multiple triplets can hash to a single hash triplet. More generally, N input-entities will hash to M output-entities, where N exceeds M.

One definition of "hash unit" is an output of a hash function, which identifies a group of entities.

Numerous substitutions and modifications can be undertaken without departing from the true spirit and scope of the invention. What is desired to be secured by Letters Patent is the invention as defined in the following claims.

What is claimed is:

1. A method of adding records to a database, comprising:
   a) maintaining several databases, each containing records;
   b) for each database, using an algorithm to generate a plurality of signatures, one for each record in the database, wherein
      i) two identical records always cause the algorithm to produce two identical signatures; and
      ii) two different records sometimes cause the algorithm to produce two identical signatures;
   c) storing the signatures;
   d) when a new record is to be added to a target database,
      i) using the algorithm to generate a new signature for the new record;
      ii) comparing the new signature with the stored signatures of the target database;
      iii) if the new signature does not match a stored signature of the target database, then adding the new record to the database;

iv) if the new signature does match a stored signature of the target database, then searching records in the target database, and
- A) if the searched records do not match the new record, then adding the new record to the database; and
- B) if the new record matches one of the searched records, calling for human intervention.

2. Method according to claim 1, wherein the records in all databases are of substantially the same type.

3. Method according to claim 2, wherein the records comprise financial statements of bank depositors.

4. Method according to claim 3, wherein each of the several databases corresponds to a separate bank, or bank branch.

5. Method according to claim 4, wherein the signatures are generated using bit masks, applied to the records.

6. Method according to claim 1, wherein the records searched in paragraph (d)(iv) include all records in the target database.

7. Method according to claim 1, wherein
- i) the new record has a group of one or more new key values, and
- ii) the records searched in paragraph (d)(iv) are limited to records in the target database having key values which are common to the new key values.

8. Method according to claim 1, wherein the signature-comparison processes of paragraph (d) rely on one or more Bloom Filters to determine whether the new signature matches a signature of a record in the target database.

9. A method of adding records to a database, comprising:
- a) maintaining several databases,
  - i) each database corresponding to a respective bank, or bank branch, and
  - ii) each database containing financial records of bank customers;
- b) for each database, using an algorithm to generate a plurality of signatures, one for each record in the database, wherein
  - i) two identical records always cause the algorithm to produce two identical signatures; and
  - ii) two different records sometimes cause the algorithm to produce two identical signatures;
- c) storing the signatures;
- d) when a new record is to be added to a target database,
  - i) using the algorithm to generate a new signature for the new record;
  - ii) comparing the new signature with the stored signatures of the target database;
  - iii) if the new signature does not match a stored signature of the target database, then adding the new record to the database;
  - iv) if the new signature does match a stored signature of the target database, then searching records in the target database, and
    - A) if the searched records do not match the new record, then adding the new record to the database; and
    - B) if the new record matches one of the searched records, calling for human intervention.

10. Method according to claim 9, wherein the records searched in paragraph (d)(iv) include all records in the target database.

11. Method according to claim 9, wherein
- i) the new record has a group of one or more new key values, and
- ii) the records searched in paragraph (d)(iv) are limited to records in the target database having key values which are common to the new key values.

12. Method according to claim 9, wherein the signature-comparison processes of paragraph (d) rely on one or more Bloom Filters to determine whether the new signature matches a signature of a record in the target database.

* * * * *